Aug. 31, 1937.  W. SCHMIDT  2,091,888
GYROSCOPE
Filed Aug. 25, 1934
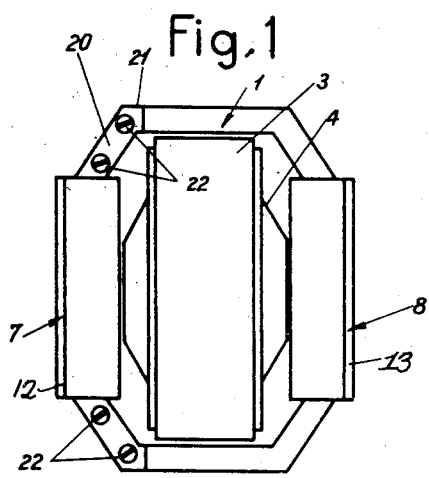
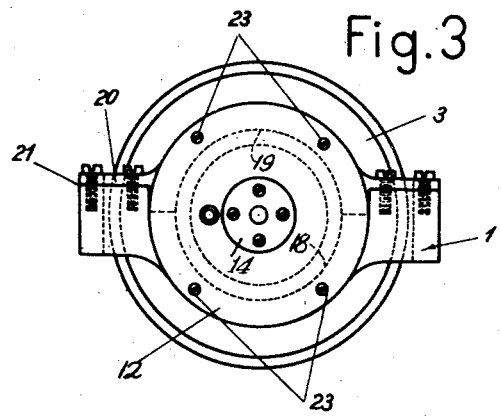
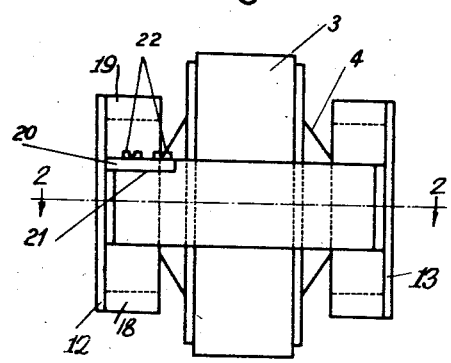
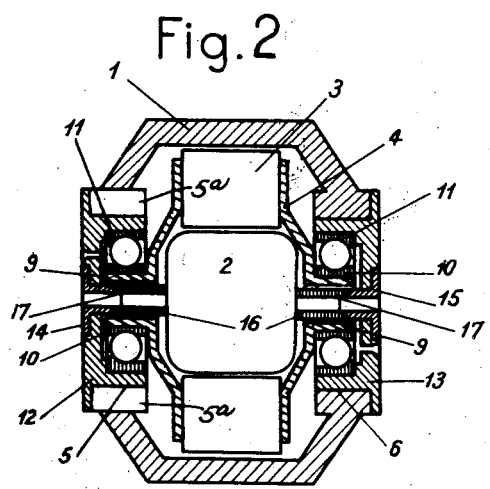
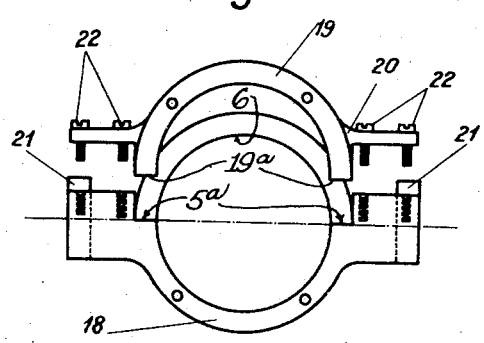
Inventor
WALTER SCHMIDT
By Stephen Cerstvik
his Attorney Patented Aug. 31, 1937

2,091,888

UNITED STATES PATENT OFFICE 2,091,888

GYROSCOPE

Walter Schmidt, Berlin, Germany, assignor to Pioneer Instrument Company, Inc., Brooklyn, N. Y., a corporation of New York Application August 25, 1934, Serial No. 741,528

5 Claims. (Cl. 74—5)

This invention relates to gyroscopic apparatus and, more particularly, to electrically driven gyroscopes.

The object of this invention is to improve and simplify the construction of the apparatus of the above type, so as to insure lightness in weight and ease in mounting and assembling as well as in centering of the gyroscopic element.

In the apparatus of the above kind, the gyroscope comprises usually a stator provided with a shaft on which is rotatably mounted the flywheel mass surrounding said stator and forming the gyroscopic rotor. According to the invention, the stator shaft is not formed, as is usual, of one piece, but of a middle portion and two side portions of a particular form and execution, adapted to form, when assembled, one rigid shaft insuring a perfect centering of the gyroscope in its supporting frame.

The above and other objects and novel features of the invention will appear more fully hereinafter from the following detailed description when taken in connection with the accompanying drawing, wherein similar reference characters refer to similar parts throughout the several views. It is to be expressly understood, however, that the drawing is for purposes of illustration only and is not designed as a definition of the limits of the invention, reference being had for this purpose to the appended claims.

In the drawing:

Fig. 1 is an exterior plan view of the gyroscope.

Fig. 2 is a sectional plan view of the same taken on line 2—2 of Fig. 4.

Fig. 3 is an end view of the gyroscope as viewed from the left of Fig. 1 and turned ninety degrees counterclockwise.

Fig. 4 is a side view of the same as viewed from the right of Fig. 3.

Fig. 5 is an end view of the gyroscopic frame disassembled.

On the drawing is represented a frame 1 in which is journaled the gyroscope comprising a stator 2 and a flywheel mass 3 forming with supporting end plates 4 the gyroscopic rotor. The frame 1 is provided with two opposite openings or apertures 5—6 adapted to receive detachable bearing members, generally designated by the reference numerals 7—8, supporting the gyroscope. The end plates 4 of the rotor are formed with hollow projections 9 receiving ball bearing rings 10 which constitute a part of detachable bearing members 7—8. The shouldered rings 11 of the ball bearings, instead of being mounted directly in the frame 1, as is usual, are mounted in the frame by means of bushings 12—13. As shown in the drawing, the shouldered rings 11 of the ball bearings are inserted in bushings 12—13, which, in their turn, are adapted to be fitted tightly into the opposite openings 5—6 of the supporting frame 1. This arrangement insures the proper mounting of the bearings in bearing members 7—8 and, practically, eliminates the possibility of gripping of said bearings, a result which is rather difficult to obtain in the conventional constructions in which the shouldered rings 11 of the ball bearings are mounted directly in the frame and clamped therein by means of insertion pieces secured to the frame by means of screws.

The ball bearing supporting bushings 12—13 carry rigidly secured therewith bearing shaft journals 14—15 forming end portions of the stator shaft. The middle portion 16 of said shaft is secured to the stator 2 and has its ends freely passing through the hollow projections 9 of the supporting end plates 4 of the rotor. The extremities of the middle shaft portion 16 and of the end portions 14—15 carried by the removable bushings 12—13 are of oppositely disposed wedge shaped configurations 17 and are adapted to fit accurately one with the other when said bushings are mounted in the corresponding openings of the supporting frame 1. The cooperation of said wedge shaped configurations 17 insures instantaneously, upon mounting of bushings 12—13, a perfect centering of the gyroscope as a whole and simultaneously renders the stator 2 thereof stationary.

The supporting frame 1 is essentially simplified in that, while in previous constructions, in order to facilitate the insertion of the gyroscope into the frame, the frame was provided on each end thereof with an opening formed of two parts one of which was removable, in the arrangement shown in the present application, the frame has only one opening formed of two separable parts. As shown in the drawing, the left hand aperture 5 of the frame is formed by two semi-circular halves 18—19, one of which, the lower one 18, is integral with the frame, while the upper one 19 is removable. The removable part of the opening is formed by an insertion piece 20 which is adapted to be received into a corresponding cut-away portion 21 in the frame 1 and is secured thereto by means of four screws 22. The ends 19a of the semi-circular piece 19 are adapted to fall onto the faces 5a of the lower half 18. This arrangement permits the gyroscope to be mounted in the frame 1 in a simpler manner than previous constructions permit. The frame 1 is also more stable with one insertion piece 20 than with the normal construction, wherein two pieces are utilized.

From the above description, the operation of assembling the gyroscope is self-evident. The finished gyroscope, comprising the stator 2 and the rotor, formed by the flywheel mass 3 and the supporting plates 4, with the central portion 10 of the detachable bearing members 7—8, is introduced into the frame 1 through the split opening 5 thereof. When the gyroscope is placed thus in the frame, first of all the split opening 5 of the frame is closed by the insertion piece 20 and then the bushings 12—13 with the shouldered rings 11 of the ball bearings are introduced into the end openings 5—6 of the frame. The bushings 12—13 are adapted to fit tightly in the apertures 5—6 of the frame and are fixed in place by screws 23.

As was indicated, the ball bearing bushings 12—13 carry, rigidly secured therein, bearing shaft journals 14—15 provided with wedge shaped portions which are adapted to fit accurately into the corresponding opposite wedge portion of the stator shaft 16. As a result of this arrangement, when the ball bearing bushings 14—15 are fixed in place in the frame 1, there is obtained instantaneously, by the cooperation of said wedge portions, a reliable and accurate centering of the whole arrangement and, at the same time, the stator 2 of the gyroscope is rendered immovable.

Thus, the invention provides an improved construction of an electrically driven gyroscope, whereby the apparatus has a minimum number of parts permitting an easy manufacture and a very simplified assembly insuring automatically an accurate and reliable centering of the gyroscopic element.

While there has been shown and described only one embodiment of the invention, it is to be understood that the same is not limited thereto but may be embodied in various mechanical forms and that various changes may be made in the relative sizes, shapes and relative locations of the component parts without departing from the spirit of the invention, as will be understood by those skilled in the art. Reference will therefore be had to the appended claims for a definition of the limits of the invention.

What is claimed is:

1. In a device of the class described, a frame, a rotor, a hollow shaft on the rotor, a stator, a hollow shaft on the stator and extending into the rotor shaft and means comprising bearings for the rotor shaft and an element axially engaging the ends of the hollow stator shaft and adapted to center the rotor and stator with respect to each other and with respect to the frame.

2. In a device of the class described, a frame, a stator having an open ended shaft, a rotor having a shaft encompassing the stator shaft, ball races carried by the ends of the rotor shaft, balls in the races, and means mountable in the frame adapted to fix the balls in place and to engage the open ends of the stator shaft to center the stator and rotor shafts in spaced relation.

3. An electric gyroscope comprising a frame having bearing receiving openings at opposite ends thereof, a bushing rigidly secured in each opening, ball bearings in said bushings and each bearing comprising an outer race secured in its associated bushing and an inner race rotatable within the outer race, a rotor having a hollow shaft the ends of which are within and rotatable with the inner race of the ball bearings, a stator concentrically disposed within said rotor and having a shaft the ends of which extend through the hollow rotor shaft, and means anchoring the ends of the stator shaft to the bushings in the respective openings of the frame.

4. An electric gyroscope comprising a frame having circular openings at opposite ends thereof and having bearing assemblies therein, each bearing assembly comprising a bushing, an outer ball bearing race secured in said bushing, an inner race rotatable within said outer race, an annular rotor having a hollow shaft with the ends thereof within and rotatable with said inner race, a stator concentrically disposed within said annular rotor and having a shaft the ends of which extend through the hollow rotor shaft and are provided with axially and inwardly tapered recesses constituted by at least two flattened surfaces, and means anchoring said stator shaft in said bushings, said means comprising metal inserts adapted to be inserted axially into the recesses at the ends of the said stator shaft and to be rigidly held in said bushings.

5. An electric gyroscope comprising a frame having a circular opening at each end thereof for receiving bearing assemblies therein, said openings being formed by two ring-shaped members, one at each end of the frame and one of which is constituted by two separable substantially semicircular sections adapted to be rigidly secured together, and the other of said ring members being integral with said frame, an annular rotor having a hollow shaft, a stator disposed concentrically with said annular rotor and having a shaft extending through the hollow shaft of the rotor, means secured in said openings and providing ball bearing assemblies in said frame for said shafts, and means engaging the ends of said stator shaft for anchoring said shaft in the bearing assemblies.

WALTER SCHMIDT.